US006927684B2

(12) United States Patent
Joyner et al.

(10) Patent No.: US 6,927,684 B2
(45) Date of Patent: Aug. 9, 2005

(54) SUBNET ADDRESSABLE RADIO ACTIVATED SWITCH

(76) Inventors: Victor Joyner, 15927 Parkside Ave., South Holland, IL (US) 60473; Kevin P. Reilly, 200 W. Market St., Hertford, NC (US) 27944-1153; Harold A. Gell, 13720 Lockdale Rd., Silver Spring, MD (US) 20906

( * ) Notice: Subject to any disclaimer, the term of this patent is extended or adjusted under 35 U.S.C. 154(b) by 245 days.

(21) Appl. No.: 10/359,255

(22) Filed: Feb. 6, 2003

(65) Prior Publication Data

US 2004/0155792 A1 Aug. 12, 2004

(51) Int. Cl.[7] ........................................ H04Q 7/00

(52) U.S. Cl. ........................ 340/539.1; 340/825.57; 340/825.69; 455/403

(58) Field of Search ..................... 340/539.1, 825.57, 340/825.61–825.69, 10.52; 455/403, 422.1, 466, 344, 352, 362

(56) References Cited

U.S. PATENT DOCUMENTS 5,917,405 A * 6/1999 Joao ..................... 340/426.17
6,166,652 A 12/2000 Benvenuti ............. 340/825.49
6,185,410 B1 * 2/2001 Greene ..................... 455/100
6,567,502 B2 * 5/2003 Zellner et al. ............... 379/45
6,661,350 B1 * 12/2003 Rohrberg et al. ...... 340/825.69
2001/0030612 A1 * 10/2001 Kerber et al. .......... 340/825.69

* cited by examiner

*Primary Examiner*—Phung T. Nguyen
(74) *Attorney, Agent, or Firm*—Harold Gell, P. C.; Harold Gell

(57) ABSTRACT

A remotely activated control device responsive to a specific transmitter operating in a frequency band assigned to radio telephone equipment, such as cellular telephone networks, cordless telephones, etc. The control device includes a radio receiver which provides a received pulse train to an assurance logic circuit. The assurance logic circuit determines if the received pulse train is limited to no more than a transmitter identification code and an action code, the combination of which is less than the code required to activate a relay network or initiate a radio telephone connection. Pulse trains accepted by the assurance logic circuit are compared to a stored code by a comparitor. The stored code includes the identification of a specific transmitter or group of transmitters and at least one action code. If the received pulse train matches the stored code, a switching circuit is activated to control a user supplied device.

21 Claims, 4 Drawing Sheets

SUBNET ADDRESSABLE RADIO ACTIVATED SWITCH

FIELD OF THE INVENTION

The present invention relates to a method and system for using a cellular or cordless telephone to selectively activate remote switching devices without the use of an intervening communication network or relay system.

BACKGROUND OF THE INVENTION

Cellular mobile telephony is one of the fastest growing segments in the worldwide telecommunications market. In the United States, the Advanced Mobile Phone Service (AMPS) began in 1984 and has grown from an initial 25,000 subscribers to over 90 million. Concurrent with this phenomenal growth of the cell phone industry has been the equally rapid rise in the use of remote radio controlled switching systems for controlling devices such as garage and automobile door openers and activating signaling means such as causing the blinking of lights or sounding of an audible alerting means. To keep pace with this burgeoning technology, the average suburbanite is normally equipped with at least three radio transmitters, i.e., a cell phone, a garage door opener and a combination automobile door lock controller, alarm and locating signal activator. This excess of transmitters is costly in terms of hardware procurement and batteries to power the various devices. Thus a need exists to eliminate the redundancy of transmitters without creating a new, complex multi-functional transmitter which would only add to the proliferation of transmitters.

DISCUSSION OF THE RELATED ART

Attempts have been made to provide a multi-use transmitter but they have been limited to only a few closely related applications that fail to solve the basic problem or involve the use of a costly service as a facilitator. For instance, regarding the first class of multi-use transmitters, most automobile manufacturers provide an accessory in the form of a key-fob transmitter which will open doors, sound horns and/or blink lights. Such devices work only with a vehicle system and comprise one of the three transmitters earlier suggested as being part of a person's normal transmitter baggage. The second class of multi-use transmitters rely on cell phone and beeper networks such as described in U.S. Pat. No. 6,166,652 for "System and Method for Locating Misplaced Items" issued to K. Benvenuti.

Benvenuti employs the transmission of a cell phone to activate a beeper network that uses special receivers to activate an output device. This system involves the cost of placing a telephone call and using the services of a beeper network to activate a remote switching means that can be used to locate an associated item. A further drawback of such systems is their reliance on a cell phone network and a beeper network, either of which may fail or be out of range, rendering the system inoperative even when the operator is near the remote object to be controlled.

OBJECTIVES OF THE INVENTION

A primary objective of the invention is to provide a system wherein reception of the code identifying a specific cellular telephone without a following cellular service identification code or a legitimate telephone number causes activation of a switching means.

Another objective of the invention is to provide a system wherein the transmission of at least a portion of the Electronic Serial Number (ESN) of a cellular telephone or cordless telephone is detected and thereby causes activation of a remote switching means.

A further objective of the invention is to provide a system wherein the transmission of only a portion of the Electronic Serial Number (ESN) of a cellular telephone or cordless telephone is detected and thereby causes activation of a remote switching means in the absence of the transmission of a completed telephone number dialing sequence.

Another objective of the invention is to provide a system wherein the transmission of the Mobile Identification Number (MIN) of a cellular telephone without a telephone number is detected and thereby causes activation of a remote switching means.

A still further objective of the invention is to provide a system wherein the transmission of at least a portion of the Mobile Identification Number (MIN) of a cellular telephone is detected and thereby causes activation of a remote switching means in the absence of the transmission of a completed telephone number dialing sequence. (The MIN is comprised of 2 parts, MIN1 which is the mobile identification number assigned to a specific phone and MIN2 which is an area code.)

A further objective of the invention is to provide a system wherein the transmission of the Electronic Serial Number (ESN) and the Mobile Identification Number (MIN) of a cellular telephone or cordless telephone is detected and thereby causes activation of a remote switching means.

Another objective of the invention is to provide a system wherein the transmission of the Electronic Serial Number (ESN) and Mobile Identification Number (MIN) of a cellular telephone or cordless telephone is detected and thereby causes activation of a remote switching means in the absence of the transmission of a completed telephone number dialing sequence.

A further objective of the invention is to provide a system wherein the transmission of the Electronic Serial Number (ESN) of a cellular telephone without a telephone number is detected and thereby causes activation of a remote switching means.

Another objective of the invention is to provide a system wherein the transmission of the Electronic Serial Number (ESN) and Mobile Identification Number (MIN) of a cellular telephone or cordless telephone without a telephone number is detected and thereby causes activation of a remote switching means.

SUMMARY OF THE INVENTION

The present invention comprises a remote receiver/comparitor and switching means. The receiver/comparitor detects cellular or cordless telephone identification codes, such as the Electronic Serial Number (ESN) and/or the Mobile Identification Number (MIN), used to identify a specific telephone, and activates the switching means. The switching means is used to control any electrically enabled device, such as a garage door remote operating system, automobile accessories, or item location signaling means (this listing is exemplary only and not intended to limit the extent of operational applications of the invention). The receiver/comparitor is programmed to recognize any one or more allowed transmitting telephones and the switching means is activated only when the transmitted code is less than a complete telephone number. If the received data packet contains data in excess of the programmed activation code, the switching means is disabled. Therefore, if the telephone transmits a legitimate telephone number, i.e. a complete executable telephone number to be called, the switching means is disabled to prevent unwanted activation of the controlled appliance.

DESCRIPTION OF THE PREFERRED EMBODIMENT

Figure 1:
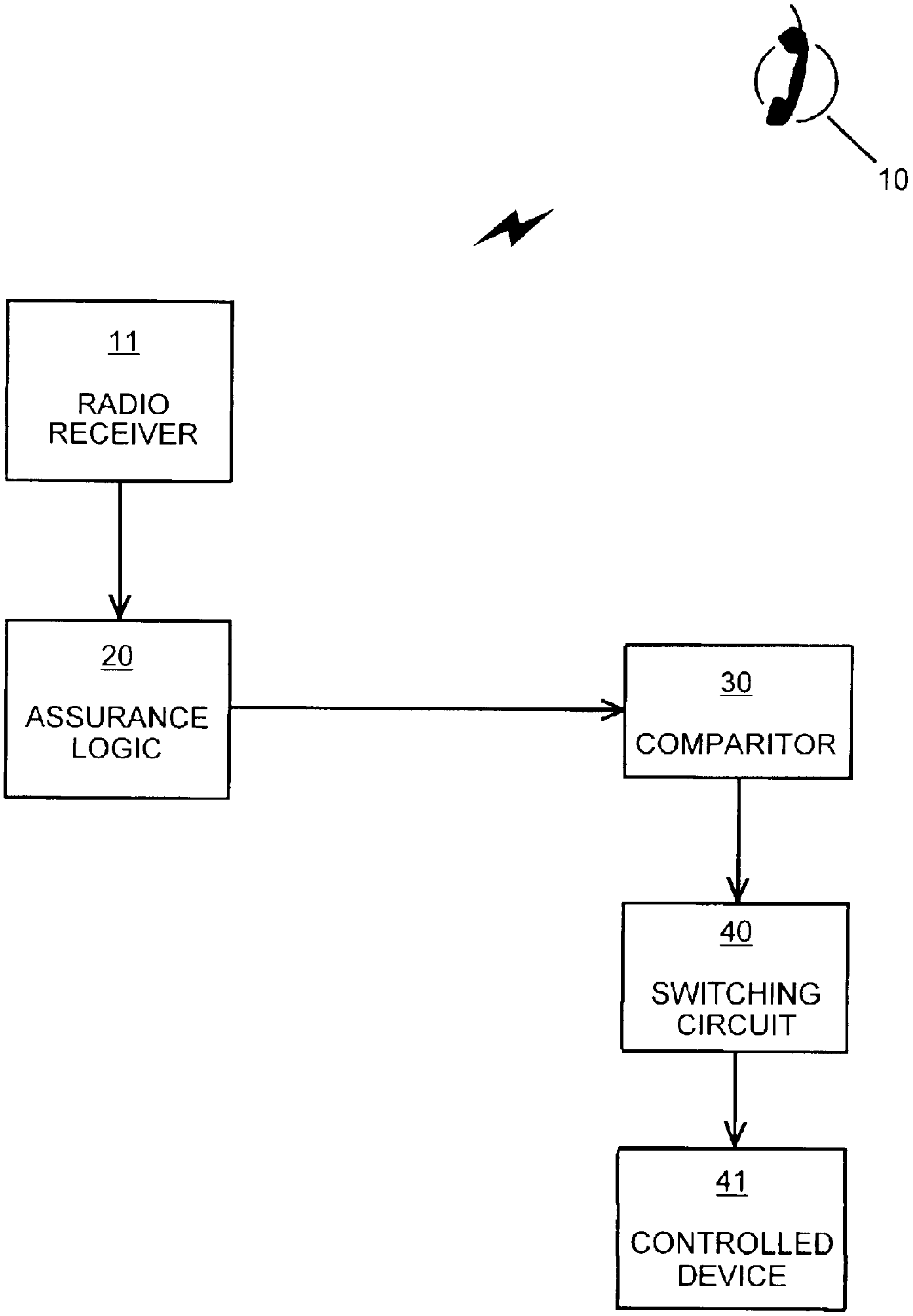
FIG. 1 is a simplified block diagram of the invention.

The Subnet Addressable Radio Activated Switch, SARAS, is designed to be a local switch, i.e. within range of a hand held radio without using repeaters. It relies on a transmitter 10 which, preferably, is a cellular telephone receiver transmitter, see FIG. 1. The transmitter may operate under any recognized protocol, such as, AMPS, CDMA, GSM, TDMA, G3 etc.

The invention per se includes a radio receiver 11 responsive to the type of transmitter being used, assurance logic 20 which determines if a series of pulses detected by the radio receiver is equivalent to the number of pulses required to digitally represent a specific series of alphanumerics, a comparitor 30 and a switching circuit 40. The switching circuit controls power to a user provided controlled device 41.

The SARAS receiver 11 is an FM, AMPS, TDMA, CDMA, or GSM receiver. The particular type of signal the receiver can detect is matched to the control transmitter 11 that will be used. Some receiver models can receive several different transmitter types through filter or other board level modifications. These can also be designed in using software configurable radios. The receiver does not limit the receiver switch design to one particular set of parameters.

A typical receiver 10 is comprised of a low noise amplifier that is tuned to the frequency band of the transmitter 11. It amplifies signals in that band/channel with a minimum of receiver introduced noise. For an exemplary AMPS cellular telephone application, this is in the 800 Mhz band. That band also accommodates the CDMA and TDMA cellular telephone applications in the U.S.A. The signal is passed to an IF mixer/down converter which mixes an intermediate frequency with the signal to strip the carrier frequency. The resultant baseband signals containing the received data are demodulated and the resultant pulse train is forwarded to the pulse train gate 51, or in the alternate embodiment, to the CPU. The CPU extracts the important data and matches that with the stored data to determine if a valid activation code has been received in a manner similar to that described in conjunction with FIG. 2. When a received code is verified correct, the CPU activates the switching circuit 40.

The identification code for a cellular phone is a two part code that is comprised of the Mobile Identification Number (MIN) and the cellular telephone Electronic Serial Number (ESN). These two numbers are transmitted when the control cellular telephone, 11, initially sets up a call (i.e., when the send button is pressed). The comparitor matchs the correct positions of the MIN and ESN and the number being dialed in the call setup data stream as depicted by the logic illustrated in FIG. 2. The system compares the pulse train of bits to the number previously stored in memory as an alphanumeric pulse sequence. If they match, SARAS is listening to the correct transmitter and activates the switching circuit which may be a solid state switch or a conventional relay, provided proper action code bits are included in the received bit stream. A variety of action codes can be programmed into the comparitor 57 as alternate templates. For instance, a code may be provided to turn on a relay and another to turn off the relay, or a code may cause the relay to cycle on and off a number of times.

The action codes depend on the end use, i.e., the device to be controlled by the switching circuit. For example, if the use is a car panic alarm, the switching circuit could sound the horn thirty times, but if it is used as a garage door opener, it may just cycle the switch to an intermittent on then off, etc. The action code number can be one digit or multiple digits, but it must not be a legitimate telephone number. So as not to interfere with the cellular network, the dialed number code must be chosen to be an abnormal length, i.e., some cellular calls can be sent to 911 or 411 or *77 etc., therefore an action code of more than two digits is inadvisable.

The MIN and ESN are stored in memory to personalize the receiver to a particular transmitter (cellular telephone). SARAS can be designed to store more than one transmitter identification code or to use the fact that some ESN's have more information encoded in them, such as a manufacturer's code. The receiver can be personalized to respond to all transmitters of one manufacturer or for MIN's of a particular area code and exchange. Different cellular protocols and systems may have different protocol bitstreams and the stored code must be set to recognize them.

When a call setup bitstream is detected by the receiver, it is analyzed for the correct MIN and ESN or manufacturer number, etc. and the dialed action number code. If the complete code matches the code stored, the switching circuit 40 is activated. The SARAS returns to the active normal listening mode when the pulse train gate 51 is reset.

Different radio systems have different capabilities for false activation. The cellular telephone system has the greatest ability to avoid a false activation due to its use of MIN and ESN. Other communication systems, such as trunking FM radios, can also transmit system identification and radio identifications but the protocols are less rigorous.

By design, all cellular telephones are given an ESN, an electronic serial number. This number is unique to each telephone and the telephones are designed so that if the ESN is changed, the phone is permanently disabled. The ESN is a xxx-bit number with the first xx bits set to a specific manufacture. This is called the manufacturers code, the remaining bits complete the telephone serial number. There is provision in the future to convert the ESN to a xxx bit number. In addition to an ESN, the phone is programmed with an MIN at initial setup or when a new carrier is setup in the phone. The MIN mobile identification number is like a land based telephone number and has ten digits. These digits are transformed to an xx bit number. In the AMP protocol, the MIN is split into an MINp and an MINs. The only device in the cellular network that transmits the particular MIN and ESN of the transmitter in question is the transmitter itself and then only during certain times during a call (one time is call initiation, i.e. when the send button is pushed). Base stations do not transmit ESN and MIN's, other cellular phones transmit their own ESN and MIN. When the receiver is programmed, it is given the ESN and MIN from the transmitter in question by pressing the telephone send button when the phone is in close proximity to the receiver. It will be the strongest signal around and will be stored in memory. The programming sequence also adds a dialed number which would be normal if the phone were being used to dial a number, only the dialed number used here is a number known to be subnet (i.e. not a normally used number of digits). By using a subnet dialed number as an activation code, the receiver can ignore commands from a correct transmitter that is making a normal telephone call (using a net worthy dialed number).

While preferred embodiments of this invention have been illustrated and described, variations and modifications may be apparent to those skilled in the art. Therefore, we do not wish to be limited thereto and ask that the scope and breadth of this invention be determined from the claims which follow rather than the above description.

In a basic embodiment, SARAS is implemented as firmware comprising the radio receiver/demodulator 11, assurance logic 20 which includes a read-only memory programmed to operate gate and register circuits which determine the acceptability of a received pulse train, i.e., a digital word or words, a comparitor 30 which matches an acceptable received pulse train with a stored code word including the electronic identification number of one or more transmitters granted access to the system, and a switching circuit 40 responsive to a match between a received pulse train and the code word. The switching circuit is used for controlling one or more user provided devices 41.

Figure 2:
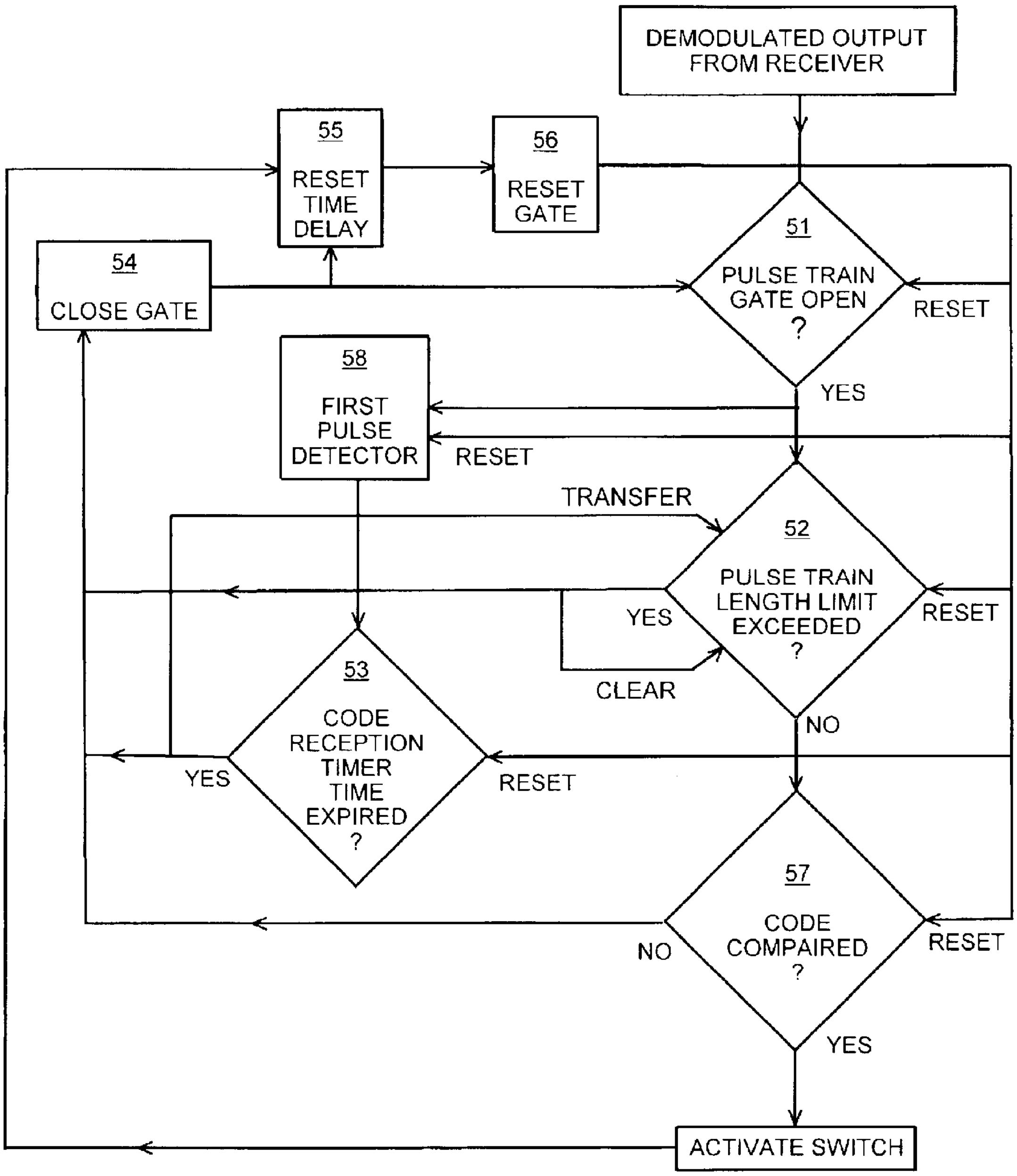
FIG. 2 is a logic diagram of a preferred application of the invention.

In a preferred embodiment, the radio receiver 1, assurance logic 20, comparitor 30 and switching circuit 40 are combined in a dedicated large scale integrated circuit (LSI) capable of preforming the receiving and demodulating functions as well as the pulse train processing and decoding functions illustrated in FIG. 2. This embodiment is a firmware system which operates with a specific class of transmitters under a specific protocol.

In a more versatile version of the preferred embodiment, the assurance logic 20 and comparitor 30 are combined in a dedicated medium scale integrated circuit (MSI) capable of preforming the pulse train processing and decoding functions illustrated in FIG. 2. In this embodiment the receiver/demodulator are separate, allowing for complete versatility of the communication system to be used as a control input. Also, the code word or words to which the incoming pulse train is compared is loaded into a small non-volatile memory means. This allows the nucleus of the system, the MSI, to be used with a variety of receivers responsive to radio telephones, including cell phones operating under any convention.

In an alternate embodiment, the functions of the assurance logic 20 and comparitor 30 are provided by a central processor (CPU) and non-volatile memory containing the required operating program and code word used to identify an allowed transmitter and function to be controlled. The central processor may be a low end "off-the-shelf" device such as a Zilog Z-80, but the invention will work with any CPU available now or in the future.

Preferred embodiments of SARAS have a program mode wherein transmissions from the control device, 10, i.e., cell phone, etc., are received and the transmitted Electronic Serial Number and/or the Mobile Identification Number (ESN, MIN, id code, strobe code, etc) are stored in memory. This number is thereafter used in a code comparitor to recognize an authorized command signal from the control radio. Additional comparitors can be added to the SARAS to allow more than one unique control radio to activate the switching circuit 40.

The comparitor, 57 of FIG. 2, compares digital data representing specific alphanumerics to the series of received pulses. It is programmed to recognize a class of transmitter identifying serial numbers or allow activation with only a specific transmitter identification number. In addition, the comparitor is trued only when a proper action authorization code is appended to the transmitter identification alphanumeric code. The output of the comparitor 57 can be used to turn off, turn on, change state (turn OFF to ON or ON to OFF) and/or activate more than one relay switch as controlled by the action code. The comparitor may have a plurality of outputs responsive to different action codes and/or transmitter identification codes to provide for activation of a plurality of switching means as functions of the control transmitter and/or the action authorization code.

To prevent the SARAS system from activating when the controlling transmitter 11 is a cellular phone transmitting a telephone call, the device activates the switching circuit 40 only in response to an incomplete telephone number, as explained in detail with respect to FIG. 2. The SARAS activation code can be of variable length, but always less than a complete telephone number recognizable by the cellular network in the case of a cell phone transmitter. The activation code is user selectable during the SARAS programming mode wherein the transmitter identification and function codes are stored in memory.

In a preferred embodiment, SARAS responds to specific, preprogrammed templates of bits representing specific alphanumerics that include pulse train segments unique to specific cellular telephone transmitters. This is accomplished by a receiver/comparitor combination that may be provided as firmware comprised of a program implemented in a read-only memory (ROM) device in combination with software and hardware designed for the specific task or as a microprocessor based system. Regardless of how the invention is implemented, a preferred embodiment performs the functions presented in FIG. 2. FIG. 2 assumes a demodulated output from a radio telephone receiver, 10 of FIG. 1, in the form of a pulse train wherein the pulses represent data bits corresponding to numbers identifying a specific transmitter combined with an action code identifying the function to be performed by the system. As may be seen in FIG. 2, this pulse train is applied to a pulse train gate 51 that is closed on command from the close gate control 54 or opened by a reset command from the reset gate 56. In its open, quiescent state, pulse train gate 51 supplies received pulses to the pulse train length limiting circuit 52 which includes a transfer buffer that temporarily stores the received pulse train. If the length of the received pulse train exceeds a preset value, a close command is sent via close gate control 54 to close the pulse train gate 51 and initiate the reset time delay 55. The close command also clears the transfer buffer. When the reset time delay times out, the assurance logic and comparitor circuits 51, 52, 53, 57 and 58 are reset.

The first pulse passing through the pulse train gate 51 is detected by the first pulse detector 58 which initiated the code reception timer 53. The code reception timer 53 provides a window during which a received pulse train may be processed. When the time determined by timer 53 expires, a close gate command 54 is initiated to close the pulse train gate 51 and start the reset time delay 55. If the length of the received pulse train has not exceeded the value preset in the pulse train length limit circuit 52 when the code reception timer 53 times out, a time expired signal from the code reception timer 53 triggers the close gate control 54. The time expired signal also commands the pulse train length limit circuit 52 to transfer the contents of its transfer buffer, which has been accumulating pulses received through the pulse train gate 51, to the code comparitor 57 as a serial or parallel data word. If the data word is identical to the code stored during SARAS programming, an activate switch command is generated to operate the switching circuit 40. The activate switch command also initiates the reset time delay circuit 55. When the reset time delay circuit 55 times out, a command is sent to reset the pulse train gate 51, pulse train length limit circuit 52, code reception timer 53, code comparitor 57 and the first pulse detector 58.

The system has several levels of security, assurance that the transmitter 10 sending the operation code is the correct transmitter. For instance, on call origination, a cellular mobile station sends the MIN1, MIN2 and ESN in the format stipulated by the industry standard. The assurance logic 20 matches the received bit pattern from the mobile station, identifies it as an origination sequence based on the MIN1, MIN2 and ESN which were stored in memory as the identification and action code during the SARAS programming mode which is a learning or training sequence.

Figure 3:
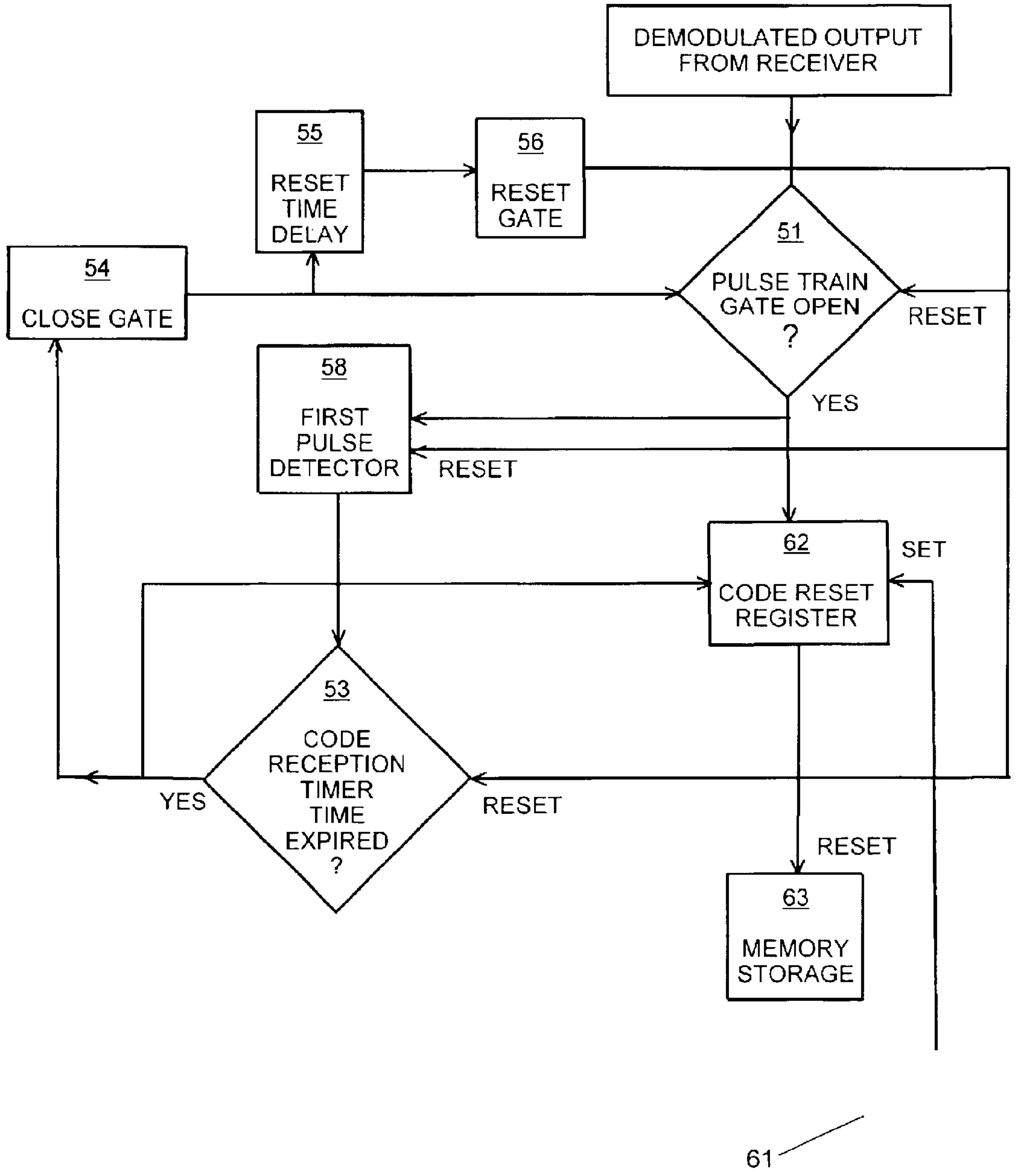
FIG. 3 is a diagram of the programming logic.

Programming is performed, in a preferred embodiment, by pressing a program/train button, 61 of FIG. 3. This enables the code reset register 62 for a brief training period. During programming, the training period, a transmitter may program the system by transmitting its identification code and an action code. When enabled, the code reset register 62 stores any pulses transmitted through pulse train gate 51 for a predetermined period of time which is set by the code reception timer 53. When the code reception timer 53 times out, data loaded in the code reset register 62 is transferred into the memory storage means 63 as digital data representing specific alphanumerics. This clears the memory of all prior data and sets the pulse train length limit parameters. If no data has been received during the training period, the code reset register 62 is disabled and the data in the memory storage means is not changed. To ensure that the desired transmitter is the only source of pulses during the training period, the receiver gain is reduced so that only signals transmitted by a transmitter located within a few feet of the receiver are detectable. This is possible because the FCC limits transmitter power output of devices operating in the frequency band used by the class of transmitters to which SARAS is responsive. Thus the only way to train this embodiment is to depress the program button 61 and immediately transmit the desired action code by entering only the action code number on the transmitter key pad and pressing the send key on the transmitter.

In an alternate embodiment, a key pad is provided as part of SARAS to enable manual programming of the code reset register without the need of a transmitter. This is a more secure alternate and may be provided as a backup programming means in the event of a failure during automatic programming.

In a best mode programming embodiment, a mutually exclusive function selection circuit replaces the code reset register. When the circuit is in the control mode, the comparator activates the switching circuit. When the circuit is in the program mode, the switching circuit is inhibited and at the end of the code reception period the stored received data is transferred into memory as a new alphanumeric code identifying a specific radio telephone and action code. In an alternate embodiment, the function selection circuit transfers the stored received data into memory concurrently with activation of the switching circuit.

During the preferred embodiment programming sequence, the action code is dialed and the send button is pressed. This starts the call origination sequence which always contains the MIN1 code. For low security operations, the switch can recognize MIN1 and the action code as the complete pulse train required to activate the switching circuit. This low security mode of operation is adequate for uses by the SARAS for non-secure operations, such as activating lights.

For higher security, the identification code can contain the MIN1 and the MIN2. But if even greater security is desired, the ESN is included in the activation code used by the system to recognize a transmitter. Since the ESN is unique to the phone, not user changeable and transmitted when a call is initiated, it is the most secure method to identify the correct activating phone. It is the preferred mode of operation.

By using an action code that represents 2 digits or less, SARAS expects that on call origination, there will be a pulse train of bits representing the transmitter identification number and no more than 2 additional digits. If a longer string of pulses is received, SARAS recognizes that bit stream as a failed sequence and will not activate.

Figure 4:
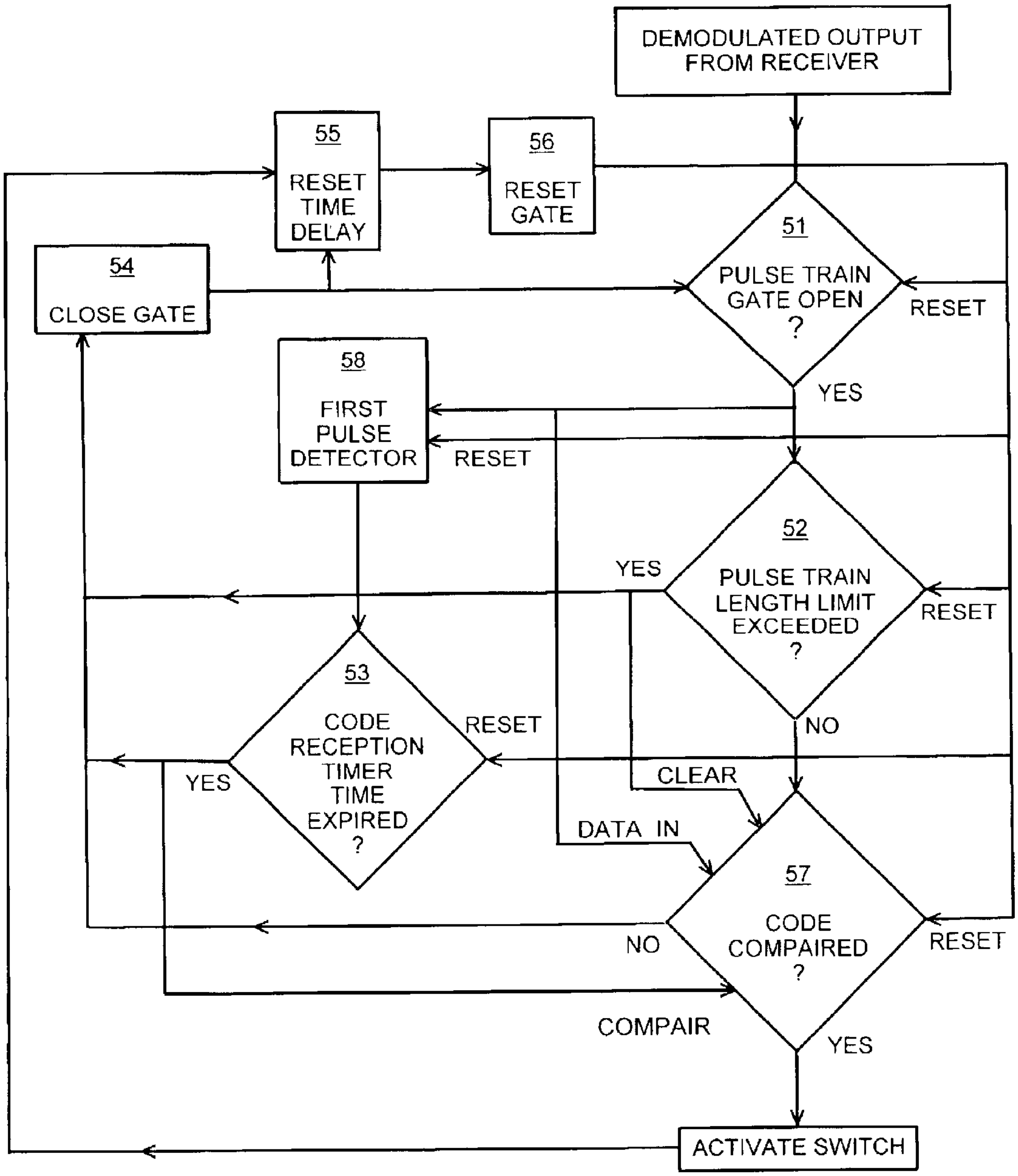
FIG. 4 is a logic diagram of an alternate embodiment of the invention.

In an alternate embodiment, the pulse train length limit means, 72 of FIG. 4, does not include a transfer buffer. It functions to determine when the alphanumeric data represented by the incoming pulse train exceeds a predetermined value. That value comprises a digital word of alphanumerics which has a bit length that is less than that required to activate a communication relay network or initiate a radio telephone connection. If the incoming pulse train exceeds the predetermined value, pulse train length limit means 72 issues a close command which causes the close gate circuit 54 to close the pulse train gate 51 and initiate a the reset timer 55. With the close command is also applied to the code comparing means 77 to clear its comparison register.

The pulse train output of the pulse train gate 51 is loaded into the comparison register within the code comparing means 77. When code reception timer 53 times out, a compare signal is sent to the code comparing means to initiate a comparison between the contents of the comparison register and the memory storage means 63.

In summary, all embodiments of SARAS identify a unique mobile station transmitter by matching a pulse train representing the bits of at least part of the alphanumeric transmitter identification code. An action code is appended to the alphanumeric transmitter identification code and the combination thereof is limited to a value which will not activate a communication relay network or initiate a radio telephone connection.

The following operational steps are employed when using SARAS to control a user supplied device:

an action code is entered via the key pad of a radio telephone transmitter;

the radio telephone transmitter send button is depressed to transmit the electronic identification serial number, ESN, and the mobile identification number, MIN, of the transmitter combined with the action code previously entered via the key pad;

the alphanumeric digital data transmitted by the radio telephone transmitter is received and demodulated by the SARAS receiver;

the first pulse of the demodulated digital data initiates a timer;

a comparison means is loaded with the demodulated digital data;

the demodulated digital data is monitored and if it becomes equal to the digital data required to initiate a radio telephone communication relay network or a radio telephone connection, the data loaded in the comparison means is cleared and monitoring of the digital data is suspended for a predetermined period of time after which SARAS is reset to a quiescent listening mode;

when the timer times out, the data loaded in the comparison means is compared to data stored in a memory means;

if the data loaded in the comparison means is identical to the data stored in the memory means, a switching circuit is activated, but if the comparison fails, SARAS is reset to a quiescent listening mode.

The steps required to store data in the memory means include the steps of:

initiating a time delay, during which period the SARAS memory may be loaded;

reducing the sensitivity of the SARAS receiver;

entering an action code into the control radio telephone transmitter;

placing the control radio telephone transmitter in close proximity of the SARAS receiver and the pressing the send button to transmit the electronic identification serial number, ESN, and the mobile identification number, MIN, of the transmitter combined with the action code previously entered via the key pad;

returning the sensitivity of the SARAS receiver to its normal operating level at the end of the time delay period;

placing the memory means in a read only mode at the end of the time delay period;

resetting SARAS to its quiescent listening mode.

While preferred embodiments of this invention have been illustrated and described, variations and modifications may be apparent to those skilled in the art. Therefore, we do not wish to be limited thereto and ask that the scope and breadth of this invention be determined from the claims which follow rather than the above description.

What is claimed is:

1. A remotely activated control device, comprising:

a radio receiver;

a response timer;

an assurance means for determining if a series of pulses detected by said radio receiver comprises a number of data bits that is less than the number of data bits required to activate a communication relay network or initiate a radio telephone connection at the end of a time period set by said response timer;

a storage means for digital data representing alphanumerics identifying a specific radio transmitter;

a comparitor for generating a control signal when said comparitor determines said digital data is identical to said series of detected pulses at the end of said time period set by said response timer; and a switching circuit for activating a user supplied apparatus in response to said control signal.

2. A remotely activated control device as defined by claim 1, wherein said digital data comprises a transmitter identification code and an action code.

3. A remotely activated control device as defined by claim 2, wherein said transmitter identification code is selected from the group of alphanumeric codes including electronic serial numbers, ESNs, and mobile identification numbers, MINs.

4. A remotely activated control device as defined by claim 1 wherein said assurance means comprises:

a pulse train gate means for controlling the flow of received data;

a pulse train limit means for closing said pulse train gate when pulses received from said pulse train gate exceed the number of data bits required for the identification of a specific transmitter and at least one action code;

a transfer buffer for temporarily storing data bits received by said pulse train limit means; and means for clearing said transfer buffer of data bits when pulses received from said pulse train gate exceed the number of data bits required for the identification of a specific transmitter and at least one action code.

5. A remotely activated control device as defined by claim 4 wherein said assurance means comprises:

a first pulse detector responsive to the output of said pulse train gate for starting said response timer when said first pulse detector detects the first pulse from said pulse train gate; and means for closing said pulse train gate when the time set by said response timer times out.

6. A remotely activated control device as defined by claim 5 wherein said comparitor comprises:

a data bit comparitor;

means for transferring the contents of said transfer buffer to said comparitor a predetermined time after said timer is initiated by said first pulse detector;

storage means for data bits representing the alphanumeric code which identifies a specific transmitter and at least one action code; and an activate switch output from said data bit comparitor when said transferred contents from said transfer buffer are identical to said data bits in said storage means.

7. A remotely activated control device as defined by claim 6, comprising:

a reset timer initiated by said means for closing said pulse train gate a predetermined time after said timer is initiated by said first pulse detector, a pulse train limit exceeded signal generated by said pulse train limit means when the number of data bits required for the identification of a specific transmitter and at least one action code, and/or a no comparison signal generated by said comparitor when said received pulse train fails to compare identically to the contents of said storage means; and a reset gate for resetting said pulse train gate, said first pulse detector, said pulse train limit means, and said timer when said reset timer times out.

8. A remotely activated control device as defined by claim 1, comprising:

a function selection means for transferring said series of pulses into said storage means for digital data at the end of said time period set by said response timer.

9. A remotely activated control device as defined by claim 1 wherein said assurance means comprises:

a pulse train gate means for controlling the flow of received data; and a pulse train limit means for closing said pulse train gate when pulses received from said pulse train gate exceed the number of data bits required for the identification of a specific transmitter and at least one action code.

10. A remotely activated control device as defined by claim 9 wherein said assurance means comprises:

a first pulse detector responsive to the output of said pulse train gate;

a timer initiated by said first pulse detector when said first pulse detector detects the first pulse from said pulse train gate; and means for closing said pulse train gate a predetermined time after said response timer is initiated by said first pulse detector.

11. A remotely activated control device as defined by claim 10 wherein said comparitor comprises:

a comparison register for temporarily storing data bits which have passed through said pulse train gate means;

storage means for data bits representing the alphanumeric code which identifies a specific transmitter and at least one action code;

means for initiating a comparison between the contents of said comparison register and the contents of said storage means in response to a time expired signal generated by said response timer.

12. A remotely activated control device as defined by claim 11, comprising:

a reset timer initiated by said means for closing said pulse train gate;

a pulse train limit exceeded signal generated by said pulse train limit means when the number of data bits required for the identification of a specific transmitter and at least one action code, and/or a no comparison signal generated by said comparitor when said received pulse train fails to compare identically to the contents of said storage means; and a reset gate for resetting said pulse train gate, said first pulse detector, said pulse train limit means, said response timer and said comparison register when said reset timer times out.

13. A remotely activated control device as defined by claim 12, comprising:

a function selection means for transferring said series of pulses into said storage means for digital data at the end of said time period set by said response timer.

14. A method for remotely controlling an apparatus, including the steps of:

storing data in a memory of a remote control device;

keying an action code into a control radio telephone;

transmitting the electronic identification serial number, ESN, and the mobile identification number, MN, of the control radio telephone combined with the action code previously entered via the key pad;

receiving with said remote control device said transmitted electronic identification serial number, ESN, and mobile identification number, MTN, of the control radio telephone combined with the action code previously entered via the key pad;

comparing said received electronic identification serial number, ESN, and mobile identification number, MN, of the control radio telephone combined with the action code previously entered via the key pad to said data stored in said memory of said remote control device if said received electronic identification serial number, ESN, and mobile identification number, MN, of the control radio telephone combined with the action code previously entered via the key pad comprises data which will not activate a communication relay network or initiate a radio telephone connection; and activating a switching circuit if said comparing step indicates the received data is identical to said stored data.

15. The method for remotely controlling an apparatus as defined by claim 14, including the steps of:

initiating a timer in said remote control device on the occurrence of the first pulse received by said remote control device; and initiating said comparing step at the end of the time period provided by said timer.

16. The method for remotely controlling an apparatus as defined by claim 15, wherein said step of storing data in a memory of a remote control device includes the steps of:

initiating a programming time delay, during which period said memory may be loaded;

reducing the sensitivity of a radio receiver of said remote control device;

entering an action code into said control radio telephone;

placing said control radio telephone in close proximity of said remote control device; pressing the send button to transmit the electronic identification serial number, ESN, and mobile identification number, MN, of the control radio telephone combined with the action code previously entered via the key pad;

returning the sensitivity of said radio receiver to its normal operating level at the end of a programming time delay period;

placing said memory means in a read only mode at the end of said programming time delay period; and resetting said remote control device to its quiescent listening mode.

17. A remotely activated control device, comprising:

a radio receiver;

a pulse train gate for controlling the flow of received data pulses detected by said radio receiver;

means for storing said received data pulses that pass through said pulse train gate;

a pulse train limit means for clearing said means for storing said received data pulses and closing said pulse train gate when pulses passing through said pulse train gate comprise a number of data bits that will activate a communication relay network or initiate a radio telephone connection;

a storage means for alphanumeric data, said alphanumeric data including a transmitter identification code selected from the group of alphanumeric codes including electronic serial numbers and mobile identification numbers identifying a specific radio transmitter and an action code;

a timer for establishing a decode time, said timer initiated by the first of said received data pulse;

a comparitor for generating a control signal when said received data pulses are identical to said alphanumeric data at the end of said decode time; and a switching circuit for activating a user supplied apparatus in response to said control signal.

18. A remotely activated control device as defined by claim 17, comprising:

means for closing said pulse train gate at the end of said decode time;

a reset delay means initiated by said means for closing said pulse train gate; and means for resetting said remotely activated control device to a quiescent listening mode at the end of said reset delay.

19. A remotely activated control device as defined by claim 18, comprising:

a function selection means for mutually exclusively enabling said switching circuit for activating said user supplied apparatus and a means for transferring the contents of said means for storing said received data pulses into said storage means for alphanumeric data.

20. A remotely activated control device as defined by claim 18, comprising:

a function selection means for transferring the contents of said means for storing said received data pulses into said storage means for alphanumeric data at the end of said decode time.

21. A method for remotely controlling an apparatus, including the steps of:

entering an alphanumeric code into a control radio telephone via its key pad; said code comprising fewer data bits than are required for initiating a telephone connection;

transmitting said alphanumeric code via said control radio telephone when said control radio telephone is within the reception range of a radio receiver responsive to signals transmitted by said control radio telephone without the need for an intervening relay means;

detecting said transmitted alphanumeric code with said radio receiver;

determining if said transmitted code comprises a number of data bits that is less than the number of data bits required to activate a communication relay network or initiate a radio telephone connection at the end of a time period set by a response timer;

comparing said detected alphanumeric code to a stored alphanumeric code incorporating the identification code of said control radio telephone if said transmitted alphanumeric code is less than the number of data bits required to activate a communication relay network or initiate a radio telephone connection at the end of said time period set by said response timer; and activating a switching means when said comparison indicates said detected alphanumeric code exactly matches said stored alphanumeric code.

* * * * *